United States Patent [19]

Pringle

[11] 3,941,221

[45] Mar. 2, 1976

[54] DISC BRAKE ROTOR ASSEMBLY

[75] Inventor: William L. Pringle, Grosse Pointe Shores, Mich.

[73] Assignee: United States Steel Corporation, Pittsburgh, Pa.

[22] Filed: Oct. 31, 1974

[21] Appl. No.: 519,523

[52] U.S. Cl. ...... 188/218 XL; 188/18 A; 192/107 R
[51] Int. Cl.² .......................................... F16D 65/12
[58] Field of Search ........ 188/218 XL, 71.6, 264 A, 188/264 AA, 18 A; 192/107 R, 113 A; 29/159.01

[56] References Cited
UNITED STATES PATENTS

| | | | |
|---|---|---|---|
| 2,197,232 | 4/1940 | Wood | 188/264 A |
| 2,728,422 | 12/1955 | Kelley | 188/218 XL |
| 2,940,548 | 6/1960 | Erickson | 188/218 XL |
| 3,208,559 | 9/1965 | Chambers et al. | 188/264 AA |

FOREIGN PATENTS OR APPLICATIONS

| | | | |
|---|---|---|---|
| 352,914 | 4/1961 | Switzerland | 188/264 AA |

*Primary Examiner*—Trygve M. Blix
*Assistant Examiner*—Edward R. Kazenske
*Attorney, Agent, or Firm*—McGlynn and Milton

[57] ABSTRACT

The application relates to a steering knuckle assembly of the type utilized for supporting the steerable wheel of an automotive vehicle. Two embodiments of the steering knuckle assembly are disclosed and both comprise an integral metal housing formed from metal plate. The housing has a front extending between a top and a bottom and includes flanges extending rearwardly from the front along the sides and top and bottom. The housing includes an actuator opening in which a hydraulic actuator is disposed. A wheel support is disposed in the front of the housing. The wheel support in the first embodiment comprises a flange for rotatably supporting a driven axle. The wheel support in the second embodiment includes a spindle for rotatably supporting a wheel. Both embodiments include a floating rotor defining a disk which is disposed between a pair of brake shoes, one of which is supported by an abutment connected to the housing and the other of which is movably supported on the housing for movement by the actuator. Each rotor disc comprise first and second members, the first of which is L-shaped in cross section and the second of which is U-shaped in cross section. The members are connected so as to define an inner space.

6 Claims, 9 Drawing Figures

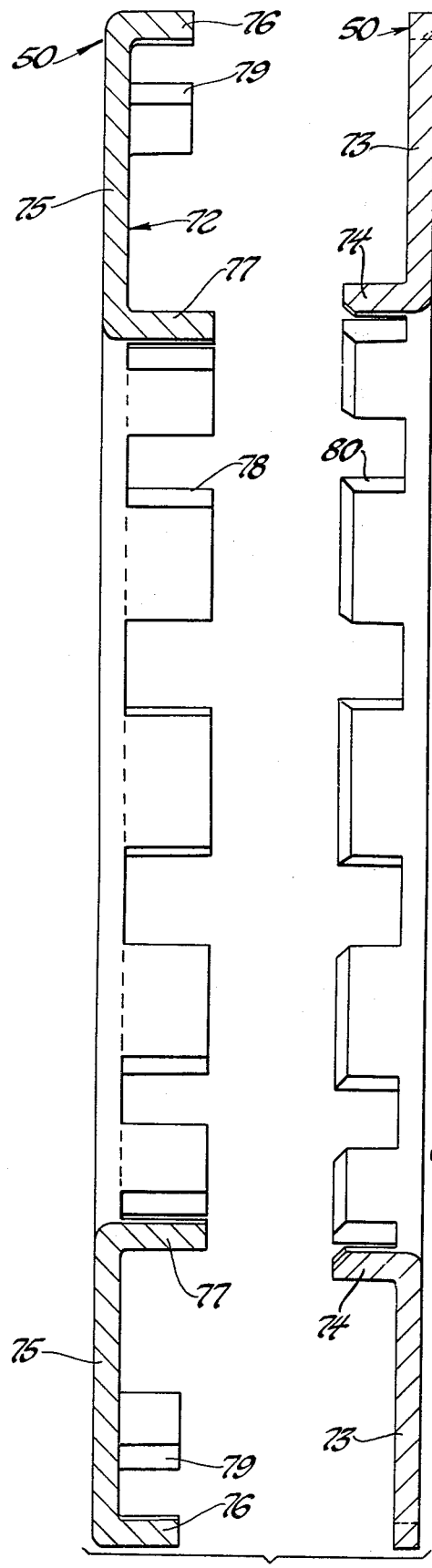
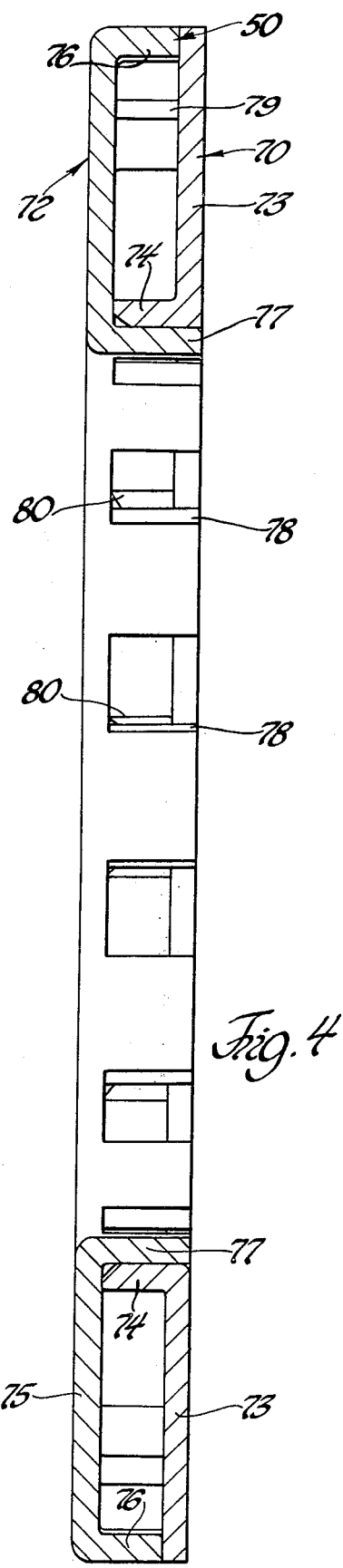

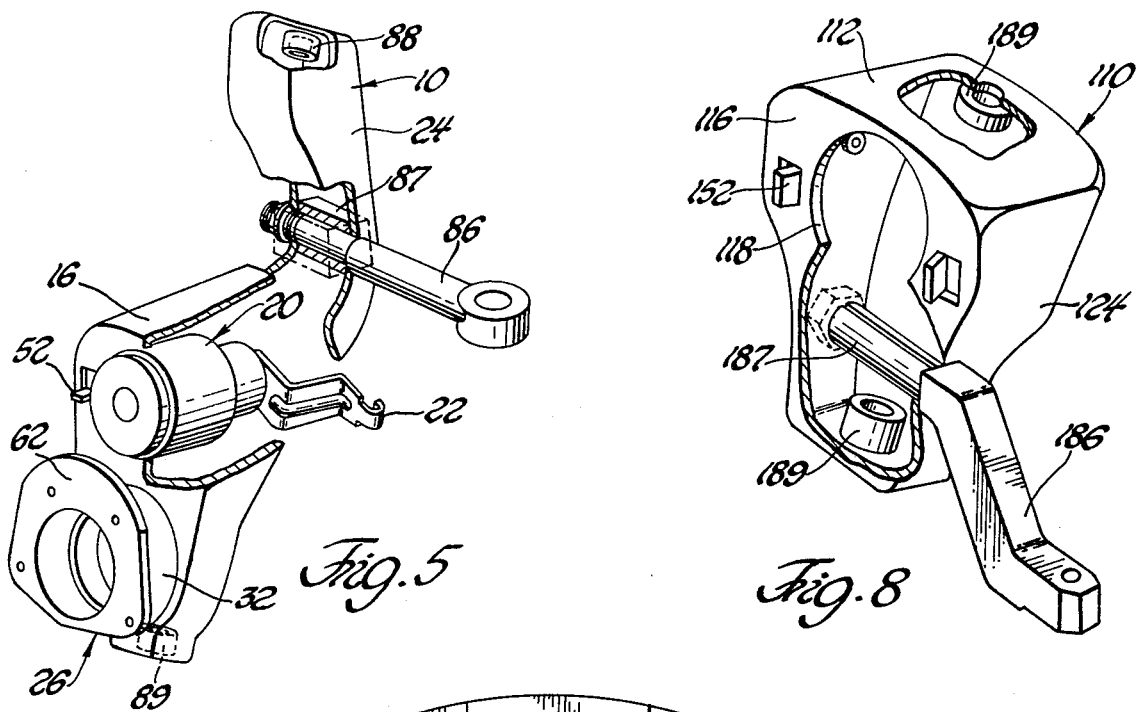
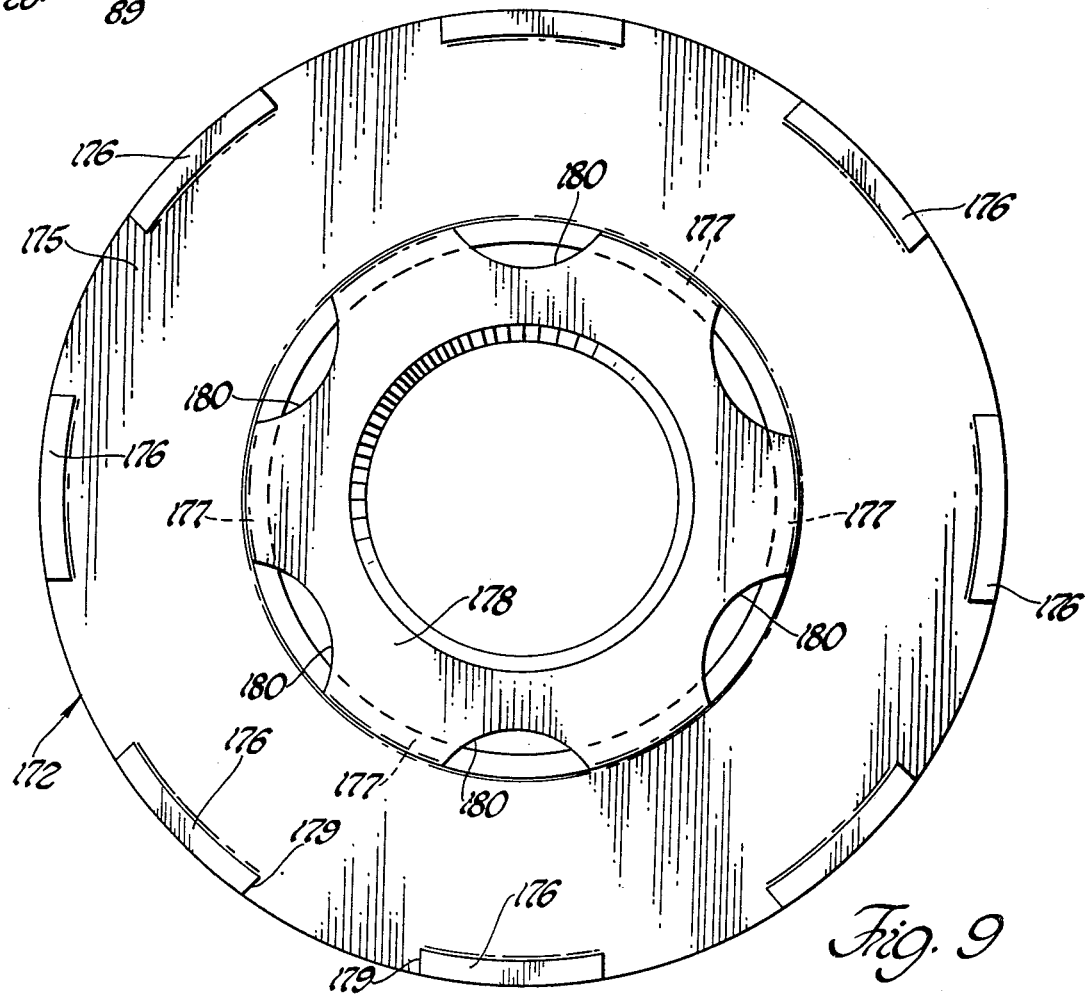

DISC BRAKE ROTOR ASSEMBLY

RELATED APPLICATION

This application discloses subject matter relating to a steering knuckle assembly which is claimed in applicant's copending application Ser. No. 519,522 filed on Oct. 31, 1974 and assigned to the assignee of the subject application.

This invention relates to a disc brake rotor assembly of the type disposed in a brake assembly to be engaged by friction surfaces to retard its rotation.

Typically, prior art rotor discs have been made by casting. Exemplary of a prior art rotor disc is that shown in U.S. Pat. No. 2,940,548. The instant invention takes advantage of sheet steel which can be formed to almost any configuration as full advantage is taken to use it in easily stamped or cold form shapes.

The subject invention is exemplified by two embodiments of a rotor disc, each of which is shown in a different embodiment of a steering knuckle assembly. Each rotor disc is a floating rotor disc in that it may move axially. Each rotor disc comprises first and second members, the first of which is L-shaped in cross section and the second of which is U-shaped in cross section with the members connected so as to define a space therebetween.

Other advantages of the present invention will be readily appreciated as the same becomes better understood by reference to the following detailed description when considered in connection with the accompanying drawings wherein:

FIG. 3 is an exploded cross-sectional view of the disc brake rotor utilized in the first embodiment;

FIG. 4 is a cross-sectional view of the disc brake rotor utilized in the first embodiment;

FIG. 5 is a fragmentary perspective view of the knuckle housing utilized in the first embodiment;

FIG. 8 is a fragmentary perspective view of the housing of the embodiment of FIGS. 6 and 7; and FIG. 9 is a side view of one-half of the disc brake rotor utilized in the embodiment of FIGS. 6 and 7.

Figure 1:
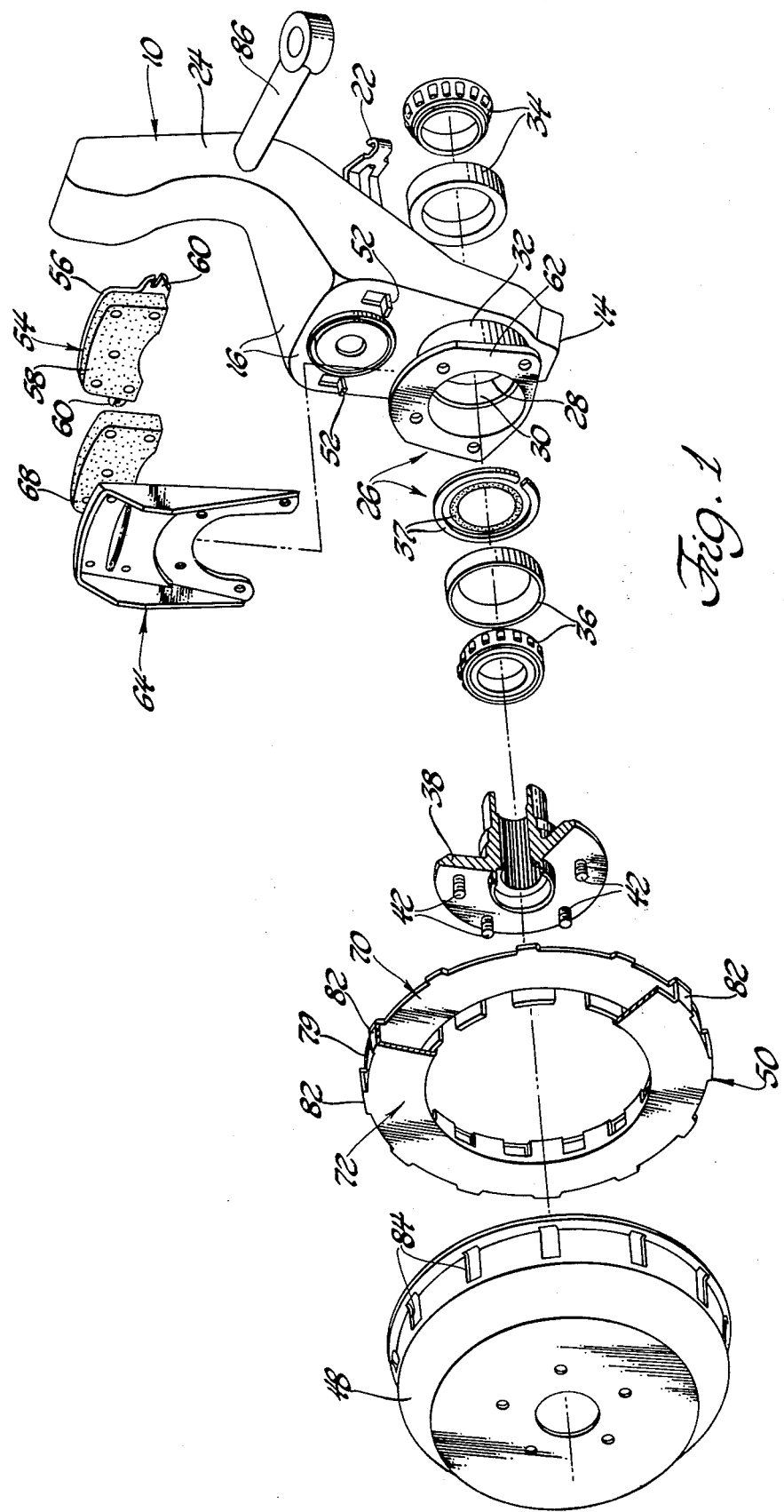
FIG. 1 is an exploded perspective view of a first embodiment of the subject invention.
Figure 2:
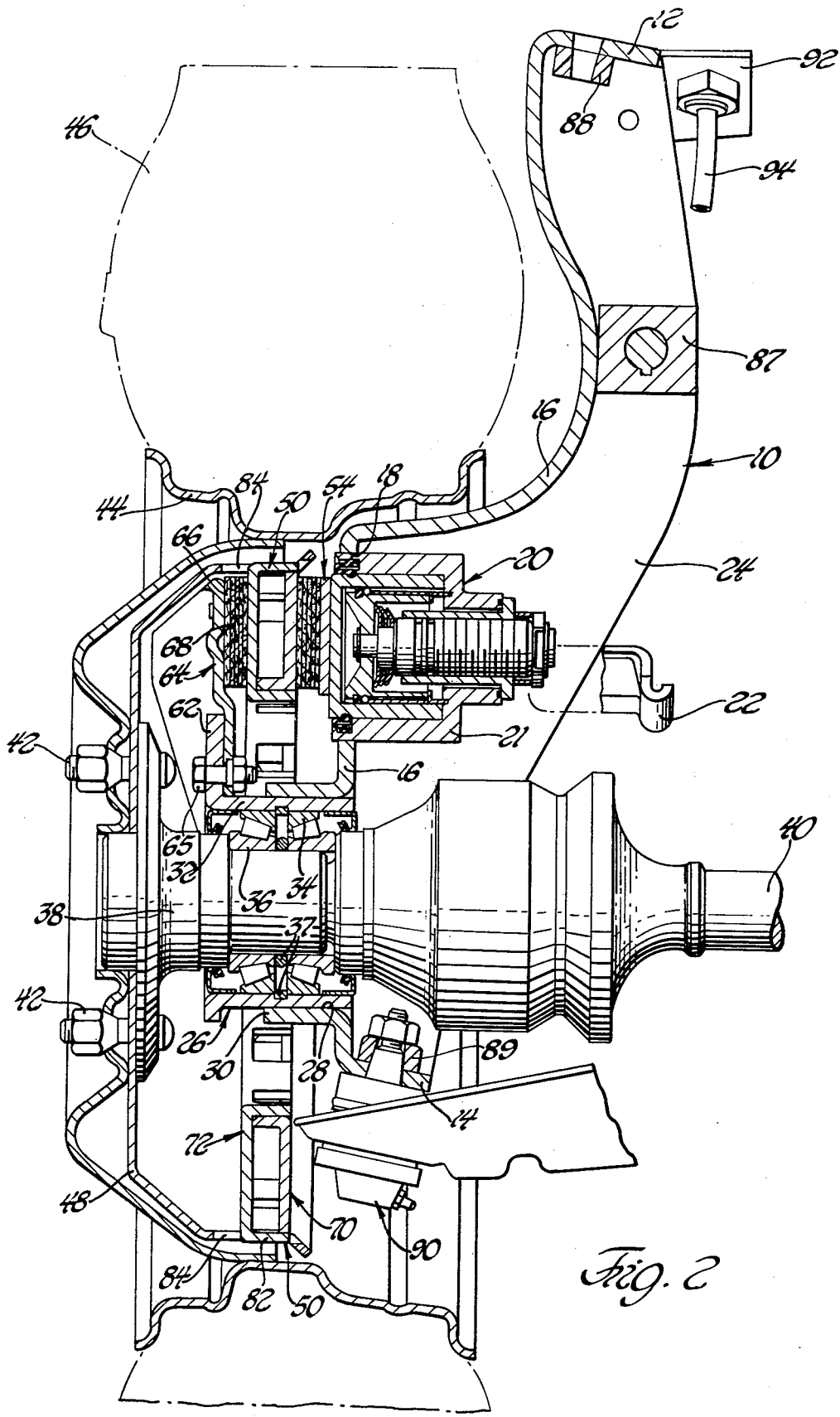
FIG. 2 is a fragmentary cross-sectional view of the first embodiment of the subject invention.
Figure 6:
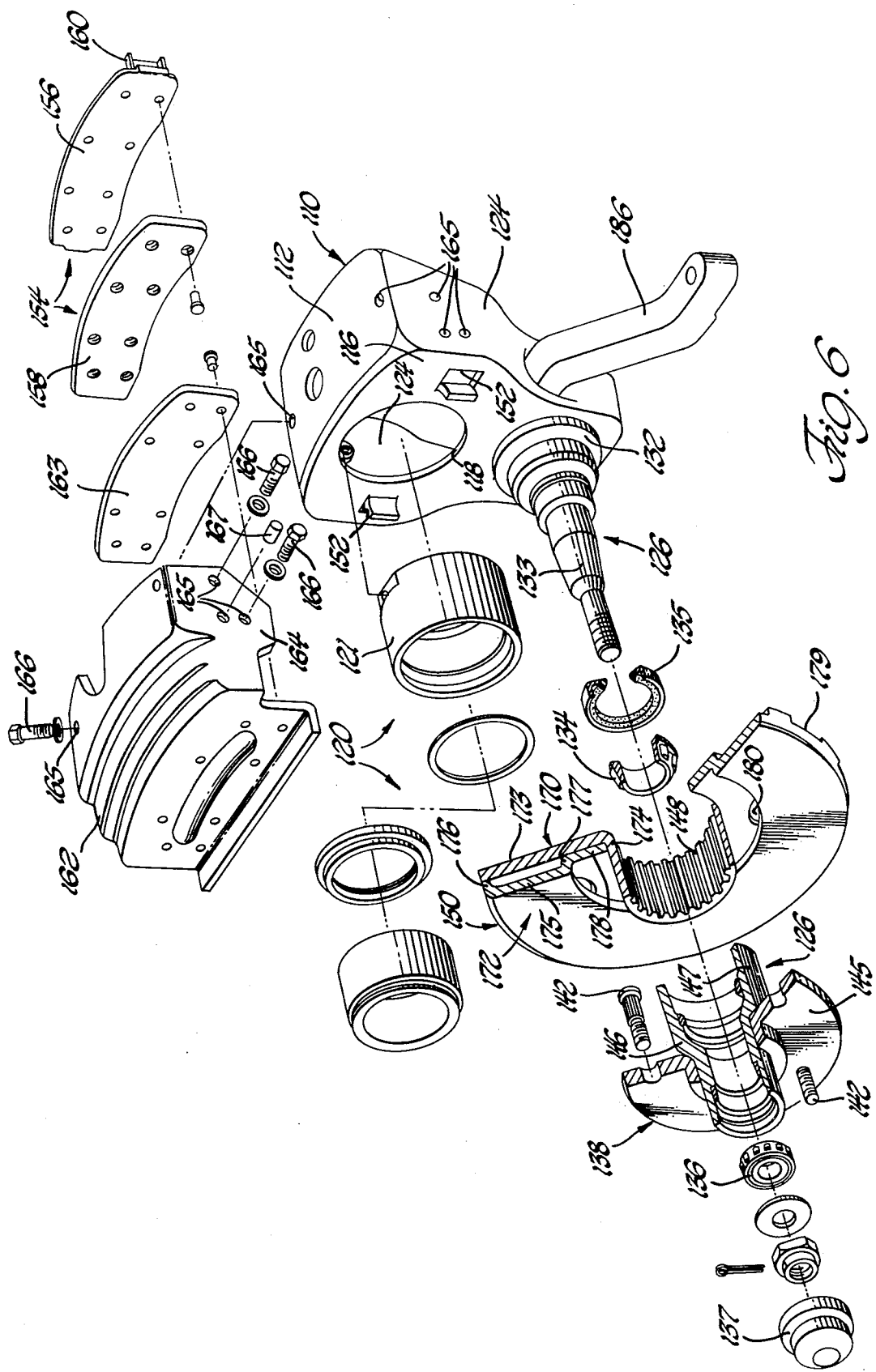
FIG. 6 is an exploded perspective view partially in cross section of a second embodiment of the subject invention.
Figure 7:
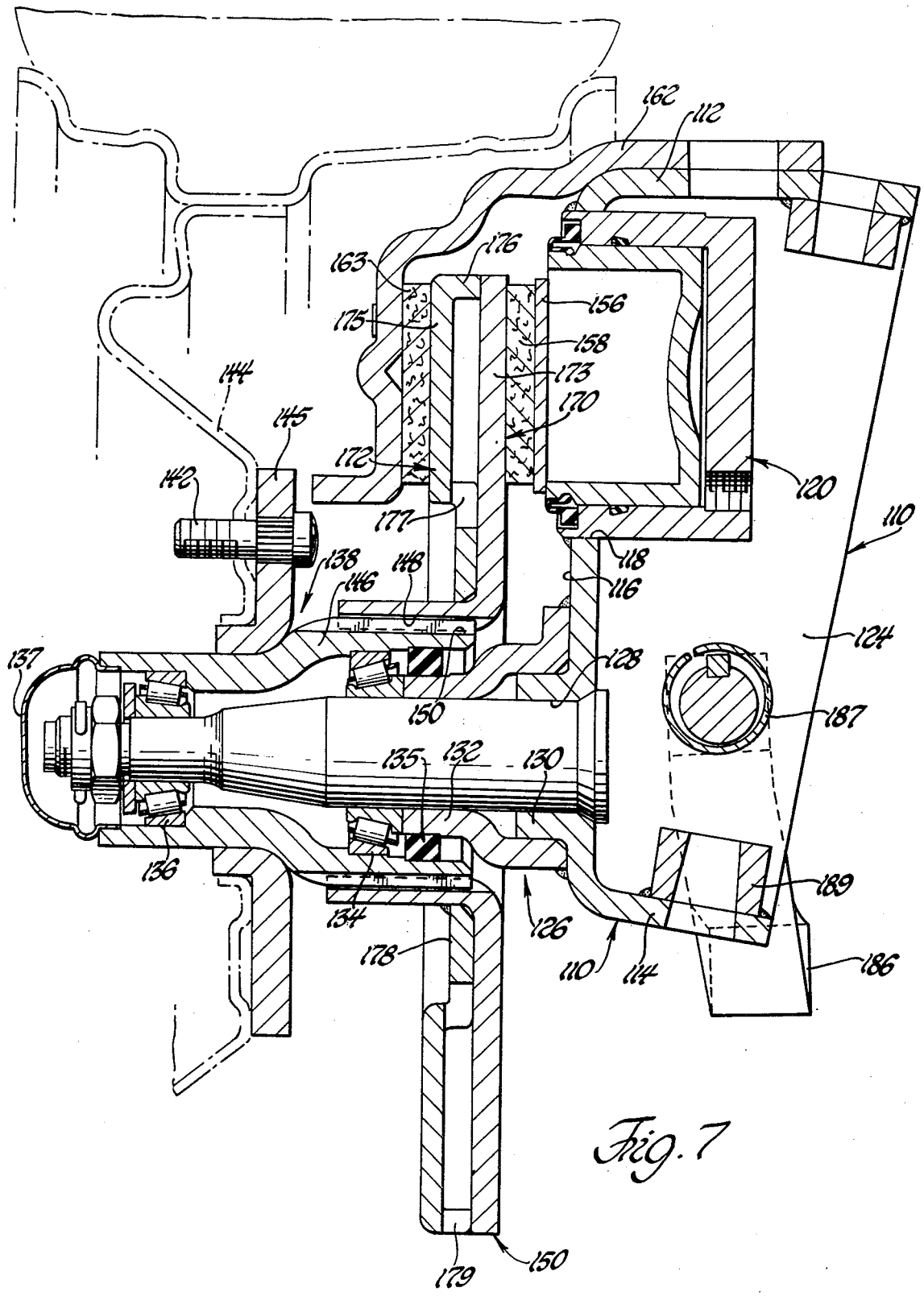
FIG. 7 is a fragmentary cross-sectional view of the embodiment shown in FIG. 6.

The embodiment of the steering knuckle assembly of FIGS. 1 through 5 includes an integral metal housing 10 formed of metal plate preferably in the form of stamped ¼ inch 1008 hot rolled sheet steel. The housing 10 has a top flange 12 and a bottom flange 14 with a front 16 extending therebetween. The housing 10 includes an actuator opening 18 which extends therethrough and receives an actuator assembly generally indicated at 20. The actuator assembly 20 includes a cup-shaped casing 21 surrounding a hydraulically actuated piston. The casing is welded to the knuckle housing 10 in the opening 18. The actuator assembly 20 reinforces the knuckle housing 10 and actuates the disc brakes, as will be more clear hereinafter. An arm 22 extends from the actuator assembly 20 for actuating the parking brake upon movement thereof. One of various actuator assemblies may be utilized in the opening 18 and the specifics of the actuator assembly 20 form no part of this invention.

The knuckle housing 10 includes integral flanges extending rearwardly from the periphery of the front 16 to define the sides 24 which extend between the top 12 and the bottom 14. Thus, the knuckle housing 10 includes flanges extending completely about the periphery of the front 16.

Also included is a wheel supporting means generally shown at 26. The wheel supporting means 26 is spaced vertically below the actuator opening 18. The wheel supporting means 26 includes a wheel support opening 28 extending through the front 16 and cylindrical means defined by the cylindrical flange 30 and tubular member 32, both of which extend forwardly from the periphery of the wheel support opening 28. Bearing means defined by the bearing assemblies 34 and 36 are disposed within the tubular member 32. The bearing assemblies 34 and 36 are separated by a seal and a snapring, both of which are indicated at 37. Also included is a drive axle means comprising the hub 38 which is rotatably supported by the bearings 34 and 36 and is in splined engagement with the drive member 40. The hub 38 includes a wheel supporting flange having studs 42 for connection to a wheel 44 which, in turn, supports a tire 46.

The studs 42 also support a generally cup-shaped rotor drive member or rotor carrier 48. The rotor drive member or rotor carrier 48 may be held on the studs 42 by head retaining screws so that the rotor carrier 48 remains in place when the wheel 44 is removed from the studs 42, although the rotor carrier 48 may be removed from the studs 42 when desired. The rotor drive member or rotor carrier 48 is in driving connection with an annular rotor disc generally indicated at 50. The rotor disc 50 will be explained in more detail hereinafter.

The housing 10 includes brake shoe supporting means comprising the tabs 52 disposed on the front 16 of the housing and on either side of the actuator opening 18. The tabs 52 are struck out of the front 16 of the housing 10 so as to extend perpendicularly from the front 16 of the housing. Floating brake shoe means generally shown at 54 is included for engaging one side of the rotor disc 50. The brake shoe means 54 includes a backing plate 56 and a pad 58 of any one of various well known friction materials. The pad 58 is connected to the plate 56 by rivets, or the like. Also included are the guide means comprising the ears 60 extending from opposite ends of the backing plate 56 of the floating brake shoe means for sliding engagement with the tabs 52 of the brake shoe supporting means for allowing horizontal movement of the floating brake shoe means 54 toward and away from the front 16 of the housing 10. The ears 60 have slots therein so that the tabs 52 are disposed in the slots for movably supporting the floating brake shoe means 54.

A support flange 62 extends radially from the distal end of the cylindrical means 32. The flange 62 has four holes extending therethrough for receiving fasteners 65 for attaching a brake shoe abutment member 64 thereto thereby rigidly connecting the abutment member 64 to the housing 10. The brake shoe abutment 64 includes a brake shoe supporting surface or plate portion 66 which, in turn, supports a brake pad 68 by rivets or the like. The fastener means 65 connect the abutment member 64 to the housing while allowing disconnection of the abutment member 64 from the housing for maintenance or replacing the brake pads 58 and 68.

The floating brake shoe means 54 extends over or diametrically across the actuator assembly 20 so that upon actuation of the actuator assembly 20, floating brake shoe means 54 moves toward the annular rotor disc 50 and toward the brake pad 68 and supporting surface 66.

The annular rotor disc 50 extends about the cylindrical wheel support means 26 and is disposed axially between the brake shoe abutment member 64 and the floating brake shoe means 54. There is also included a floating connection means interconnecting the rotor disc 50 and the rotor drive member 48 for joint rotation while allowing axial movement of the rotor disc 50 relative to the rotor drive member 48.

The rotor disc 50 includes a first disc member 70 and a second disc member 72. The first disc member 70 is an integral stamped metal member having an annular configuration defining an inner diameter and an outer diameter. The first disc member 70 is L-shaped in cross section, as best seen in FIGS. 3 and 4, with the long leg 73 of the L-shape extending radially and the short leg 74 of the L-shape extending axially from the inner diameter of the member 70. The second disc member 72 is an integral stamped metal member having an annular configuration defining an inner diameter and an outer diameter and having a generally U-shaped configuration in cross section. The base 75 of the U-shape extends radially with a first leg 76 extending axially from the outer diameter and a second leg 77 of the shape extending axially from the inner diameter. The legs 76 and 77 engage the first disc member 70 for axially spacing the radially extending base 75 of the second disc member 72 from the radially extending leg 73 of the first disc member 70. The axially extending legs 76 and 77 of the second disc member 72 and the axially extending short leg 74 of the first disc member 70 have openings 78, 79 and 80 respectively extending radially therethrough for air to circulate between the radially extending base 75 of the second disc member 72 and the radially extending leg 73 of the first disc member 70. The openings 78 in the leg 77 of the second disc member 72 are aligned with the openings 80 in the short leg 74 of the first disc member 70 so as to define openings extending radially through the inner diameter of the rotor disc 50. The first leg 76 of the second disc member 72 has its distal end in abutment with the inner radial surface of the radially extending leg 73 of the first disc member 70. As best illustrated in FIG. 1, the openings 79 in the first leg 76 of the second disc member 72 are defined by cirumferentially extending slots which extend axially through the radially extending base 75 of the second disc member 72 and axially through the radially extending leg 73 of the first disc member 70 thereby defining radially extending lugs 82 between the slots 79, as best seen in FIG. 1. Preferably, the two rotor disc members 70 and 72 are stamped from 1040 steel with the braking surface on the outer radial surfaces of the legs 73 and 75 ground to a 20 to 80 micro inch finish.

The rotor drive member 48 is generally cup-shaped to include an axially extending circular flange with recesses 84 therein. The lugs 82 are slidably disposed in the recesses 84 whereby the rotor disc 50 floats and is axially movable to compensate for wear, etc., of the brake pads 58 and 68.

The short leg 74 of the first disc member 70 extends axially from the inner diameter thereof and is disposed immediately radially outwardly of the second leg 77 of the second disc member 72. More specifically, the short leg 74 is in radially abutting engagement with the leg 77. Preferably the leg 74 is press-fitted radially against the leg 77 and thereafter the disc members 70 and 72 are welded together at the inner and outer diameters thereof.

The housing 10 also includes arm support means for connection to a steering arm 86. The arm support means includes openings extending through the side flanges 24 for receiving a steering arm 86 from either side of the housing 10. A spacer means defined by a block 87 is disposed between and engages the side flanges 24 of the housing for receiving the steering arm 86.

The spacer block 87 is preferably welded in position and reinforces or forms a reinforcing box section in the housing between the side flanges 24 and the front 16. The spacer block 87 is keyed and may receive a steering arm from either side.

The front 16 of the housing 10 is wider from side to side 24 at the vertical position of the actuator opening 18 than at the vertical position of the arm support means, i.e., the spacer block 87. The wider portion of the housing 10 is adjacent the bottom thereof and the front of the housing has a lower portion defining the wider area, which wider portion includes the actuator opening 18 and the wheel support means 26. The front also includes an upper and narrower portion extending rearwardly and then upwardly from the upper extremity of the lower portion. Thus, the upper portion defines a generally L-shaped portion of the housing 10 extending from the lower wider portion. The actuator assembly 20, when welded into the actuator opening 18, reinforces the housing and the housing is also reinforced by the spacer block 87 in the L-shaped upper portion.

A very important feature of the assembly, as best illustrated in FIG. 1, is that the housing 10 and associated components, absent the steering arm 86, are symmetrical on either side of a center line passing from the top to the bottom thereof. This means that only one assembly need be produced for either the left or right hand or side of an automotive vehicle. In other words, the assembly is single handed and a steering arm such as 86 is inserted from either side of the housing, depending upon which side of the vehicle the housing is to be utilized.

There is also included steering support means comprising the bosses 88 and 89 in the top and bottom flanges 12 and 14 respectively for rotatably supporting the housing 10. The bosses 88 and 89 are pin bosses for receiving a ball joint mount, such as that generally indicated at 90 in FIG. 2, for supporting the assembly for steering, as a steering force is applied to the steering arm 86. The bosses 88 and 89 are preferably welded to the flanges 12 and 14.

A bracket 92 is attached to the housing for supporting a hydraulic line 94 which leads to the actuator assembly 20 for actuation thereof by the supply of hydraulic fluid thereto.

As will be appreciated, the assembly is very compact, lightweight and easily maintained. In the event of wear of the brake pads 58 and 68, the nuts on the studs 42 are removed to remove the wheel 44 and thereafter to remove the rotor drive member or rotor carrier 48. The fasteners 65 may be removed to remove the abutment member 64 whereupon the rotor 50 and the floating brake shoe 54 are easily removed.

The embodiment of the steering knuckle assembly of FIGS. 6 through 9 includes a integral metal housing 110 formed of metal plate preferably in the form of a stamped 5/16 inch 1008 hot rolled aluminum killed sheet steel. The housing 110 has a top flange 112 and a bottom flange 114 with a front 116 extending therebetween. The housing 110 includes an actuator opening 118 which extends therethrough and receives an actuator assembly generally indicated at 120. The actuator assembly 120 includes a cup-shaped casing 121 welded to the knuckle housing 110 in the opening 118. The actuator assembly 120 reinforces the knuckle housing 110 and actuates the disc brakes, as will become more clear hereinafter. One of various actuator assemblies may be utilized and the specifics of the actuator assembly 120 form no part of this invention.

The knuckle housing 110 includes integral flanges extending rearwardly from the periphery of the front 116 to define the sides 124 which extend between the top 112 and the bottom 114 so that the knuckle housing 110 includes flanges extending completely about the periphery of the front 116.

Also included is a wheel supporting means generally shown at 126. The wheel supporting means 126 is spaced vertically below the actuator opening 118. The wheel supporting means 126 includes a wheel support opening 128 extending through the front 116 and cylindrical means defined by the cylindrical flange 130 and tubular member 132. Flange 130 and tubular member 132 extend forwardly from the periphery of the wheel support opening 128. The wheel support means also includes a spindle 133 extending forwardly from the front 116 of the housing and rigidly secured in the opening 128 by the flange 130 and the tubular member 132. Bearing means defined by the bearing assemblies 134 and 136 are disposed on the spindle 133. A hub means generally indicated at 138 is rotatably supported on the spindle 133 through the bearings 134 and 136. The hub means 138 includes a wheel supporting flange having studs 142 for connection to wheel 144. The hub member is defined by a flange element 145 welded to a tubular element 146. A seal 135 is disposed about the spindle 133 adjacent the bearing assembly 134. Additionally, a spindle cap 137 frictionally engages the end of the hub 138 and surrounds a retaining nut which holds the assembly.

The tubular element 146 is splined at 147 for driving connection to the spline 148 of an annular rotor disc generally indicated at 150. The rotor disc 150 will be explained in more detail hereinafter.

The housing 110 includes brake shoe supporting means comprising the holes 152 disposed on the front 116 of the housing and on either side of the actuator opening 118. The holes 152 are formed as the result of striking metal in the form of tabs out of the front 116 of the housing 110. Floating brake shoe means generally shown at 154 is included for engaging one side of the rotor disc 150. The brake shoe means 154 includes a floating backing plate 156 and a pad 158. The pad 158 may be made of any one of various well known friction materials suitable for use in braking systems, and may be connected to the plate 156 by rivets or the like. Also included are the guide means comprising the ears, tabs or male projections 160 extending from opposite ends of the backing plate 156 in a direction perpendicular to the backing plate 156 for sliding engagement with the holes 152 of the brake shoe supporting means for allowing horizontal movement of the floating brake shoe means 154 toward and away from the front 116 of the housing 110.

The assembly also includes a brake shoe abutment member 162 which supports a brake pad 163 by rivets or the like. The abutment member 162 includes connecting flanges 164 at either end thereof for engaging the side flanges 124 of the housing 110. The connecting flanges 164 and the side flanges 124 have bores 165 extending therethrough. Fastener means defined by the elements 166 and the dow pin 167 extend through the bores 165 for rigidly connecting the abutment member 162 to the housing 110. The fastener means 166 and 167 are in body engagement with the bores 165 to prevent movement of the abutment member 162 relative to the housing 110 and to place the fastener means 166 and 167 in shear in response to forces urging such relative movement. The bores 165 through which the dow pins 167 extend define a center of rotation of the abutment member 162 relative to the housing 110 when the actuator assembly is actuated to force the floating brake shoe means 154 against the rotor disc 150 to in turn apply force against the abutment member 162. It is important that the fasteners 166 and 167 are in circumferentially radially binding engagement with the holes 165 so that the fasteners are placed in shear. The center defined by the dow pins 167 assures that the adjacent fasteners 166 are placed in shear. The fasteners 166 clamp the connecting flanges 164 to the side 124 of the housing 110 but should they loosen they will remain in shear preventing any relative movement between the abutment member 162 and the housing 110.

The floating brake shoe means 154 extends over or diametrically across the actuator assembly 120 so that actuation of the actuator assembly 120 moves the floating brake shoe means 154 toward the annular rotor disc 150 and toward the brake pad 163 and the adjacent supporting surface on the abutment member 162. The annular rotor disc 150 is disposed about or around the cylindrical wheel support means 126 and is axially between the brake shoe abutment member 162 and the floating brake shoe means 154. The splines 147 and 148 define a floating connection means interconnecting the rotor disc 150 and the hub means 138 for joint rotation while allowing axial movement of the rotor 150 relative to the hub means 138.

The rotor disc 150 includes a first disc member 170 and a second disc member 172. The first disc member 170 is an integral stamped metal member having an annular configuration defining an inner diameter and an outer diameter. The first disc member 170 is L-shaped in cross section with the long leg 173 of the L-shape extending radially and the short leg 174 of the L-shape extending axially from the inner diameter of the member 170. The spline 148 is disposed within the short leg 174 and defines support means disposed radially inwardly for rotating the disc members.

The second disc member 172 is an integral stamped metal member having an annular configuration defining an inner diameter and an outer diameter and having a generally U-shaped configuration in cross section. The base 175 of the U-shape extends radially with a first let 176 extending axially from the outer diameter and a second leg 177 of the U-shape extending axially from the inner diameter. The legs 176 and 177 engage the first disc member 170 for axially spacing the radially extending base 175 of the second disc member 172 from the radially extending leg 173 of the first disc member 170. The second leg 77 of the second disc member 172 also includes an integral portion or flange 178 in engagement with both legs 173 and 174 of the first disc member 170. The axially extending leg 176 of the second disc member 172 has openings 179 therein and the leg 177 has openings 180 therein. Consequently, air may circulate between the radially extending base 175 of the second disc member 172 and the radially extending leg 173 of the first disc member 170.

The openings 180 preferably are made with a circular cutter cutting into the leg 177 at circumferentially spaced intervals. The first leg 176 of the second disc member 172 has its distal end in abutting engagement with the inner radial surface of the radially extending leg 173 of the first disc member 170. Preferably, the disc members are welded together at this abutment. Additionally, the inner end of the flange 178 is preferably press-fitted against the outer circumference of the leg 174 whereby the disc members are press-fitted together, although they are preferably also welded.

The housing 110 also includes arm support means for connection to a steering arm 186. The arm support means includes openings extending through the side flanges 124 for receiving a steering arm 186 from either side of the housing 110. A spacer member comprising a tubular member 187 is disposed between and engages the side flanges 124 of the housing 110 for receiving the steering arm 186. The steering arm is held in rotative position by a Woodruff key interconnecting the arm and the sides of the housing. The spacer member 187 is preferably welded in position and reinforces or forms a box section in the housing 110 between the side flanges 124 and the front 116.

The front 116 of the housing 110 is wider from side to side at the vertical position of the actuator opening 118 than at the vertical position of the arm support means through which the arm 186 is attached. The wider portion of the housing 110 is at the top thereof. The actuator opening 118 is disposed in the top wider portion of the wheel support means 126 is disposed in the lower narrower portion of the housing 110. Further, the spacer block or tubular member 187 is disposed in the lowered narrower portion of the housing 110. The housing 110 is also narrower at the bottom than at the top when viewed in side elevation, i.e., the side flanges 124 are wider at the top than at the bottom.

Like the first embodiment, an important feature of this embodiment is that the housing 110 and associated components, absent the steering arm 186, are symmetrical on either side of a center line passing from top to bottom thereof. This means that only one assembly need be produced for either the left or right hand side of an automotive vehicle. The assembly is single handed and a steering arm 186 may be inserted from either side of the housing 110, depending upon which side of the vehicle the housing is to be utilized.

There is also included steering support means comprising the bosses 189 in the top and bottom flanges 112 and 114 respectively for rotatably supporting the housing 110. The bosses 189 are pin bosses for receiving a ball joint mount for supporting the assembly for steering as a steering force is applied to the steering arm 86. The bosses 189 are preferably welded to the top and bottom flanges 112 and 114 respectively.

Both embodiments of the subject knuckle assembly are well reinforced in that they include actuator openings 18 and 118 in which an actuator casing is disposed by being welded thereto for reinforcing the widest or broadest section of the housing 10 or 110. Actually, the casing of the actuator assembly acts as a reinforcing rib. The casing of the actuator housing may be secured to the knuckle housing 10 or 110 before or after machining. It normally would be arc-welded if it is attached before machining, but if it is attached after, it would be attached by electron beam, laser or friction welding.

In addition, the arrangement for attaching the steering arm, whereby the steering arm passes through a spacer means, also reinforces the housings as the spacer block 87 or spacer 187 engages the opposite side flanges for reinforcing the respective housings 10 and 110. The side flanges of both housings 10 and 110 include key ways to receive a spacer arm and that key way is also symmetrical whereby each of the housings 10 and 110 are completely symmetrical about the vertical planes passing centrally therethrough.

In both of the housings 10 and 110 the widest and broadest part of the housing takes the brake torque as the brake shoe attachments are attached to the widest portions.

The first embodiment of FIGS. 1 through 5 is particularly suited for a front wheel drive vehicle, although it may be used for a non-front wheel drive vehicle and the second embodiment of FIGS. 6 through 9 is particularly suited for a non-front wheel drive vehicle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A disc brake rotor assembly comprising; a first disc member, a second disc member, said first disc member being an integral metal member having an annular configuration defining an inner diameter and an outer diameter, said first disc member being L-shaped in cross section with the long leg of the L-shape extending radially and the short leg of the L-shape extending axially from one of said inner and outer diameter, said second disc member being an integral metal member having an annular configuration defining an inner diameter and an outer diameter, said second disc member having a generally U-shaped configuration in cross section with the base of the U-shape extending radially with a first leg of the U-shape extending axially from the outer diameter and a second leg of the U-shape extending axially from the inner diameter, said legs engaging said first disc member for axially spacing said radially extending base of said second disc member from said radially extending leg of said first disc member, said axially extending legs of said second disc member and said axially extending short leg of said first disc member having openings extended radially therethrough for air to circulate between said radially extending base of second disc member and said radially extending leg of said first disc member, said first leg of said second disc member abutting the inner radial surface of said radially extending leg of said first disc member, said short leg of said first disc member extending axially from said inner diameter thereof, said short leg of said first disc member being disposed radially outwardly of said second leg of said second disc member and in radially abutting engagement therewith.

2. An assembly as set forth in claim 1 wherein said short leg of said first disc member is press-fitted radially against said second leg of said second disc member.

3. An assembly as set forth in claim 1 wherein said openings in said first leg of said second disc member are defined by circumferentially extending slots which extend axially through said radially extending base of said second disc member and axially through said radially extending leg of said first disc member thereby defining radially extending lugs between said slots.

4. An assembly as set forth in claim 3 including a rotor drive member for attachment to a rotating member, said rotor drive member having an axially extending circular flange with recesses therein, said lugs being disposed in said recesses and axially movable therein.

5. A disc brake rotor assembly comprising; a first disc member, a second disc member, said first disc member being an integral metal member having an annular configuration defining an inner diameter and an outer diameter, said first disc member being L-shaped in cross section with the long leg of the L-shape extending radially and a short leg of the L-shape extending only perpendicularly from said radially extending long leg and axially from said inner diameter thereof, said second disc member being an integral metal member having an annular configuration defining an inner diameter and an outer diameter, said second disc member having a generally U-shaped configuration in cross section with the base of the U-shape extending radially with a first leg of the U-shape extending axially from the outer diameter and a second leg of the U-shape extending axially from the inner diameter, said legs engaging said first disc member for axially spacing said radially extending base of said second disc member from said radially extending leg of said first disc member, said first leg of said second disc member being in abutting engagement with the inner radial surface of said radially extending leg of said first disc member, said second leg of said second disc member having an integral portion in radially abutting engagement with said short leg of said first disc member.

6. An assembly as set forth in claim 5 wherein said integral portion of said second leg of said second disc member and said short leg of said first disc member are press-fitted radially against one another.

* * * * *